B. & C. FURNAS.
Wheel-Cultivator.
No. 36,948. Patented Nov 18, 1862.
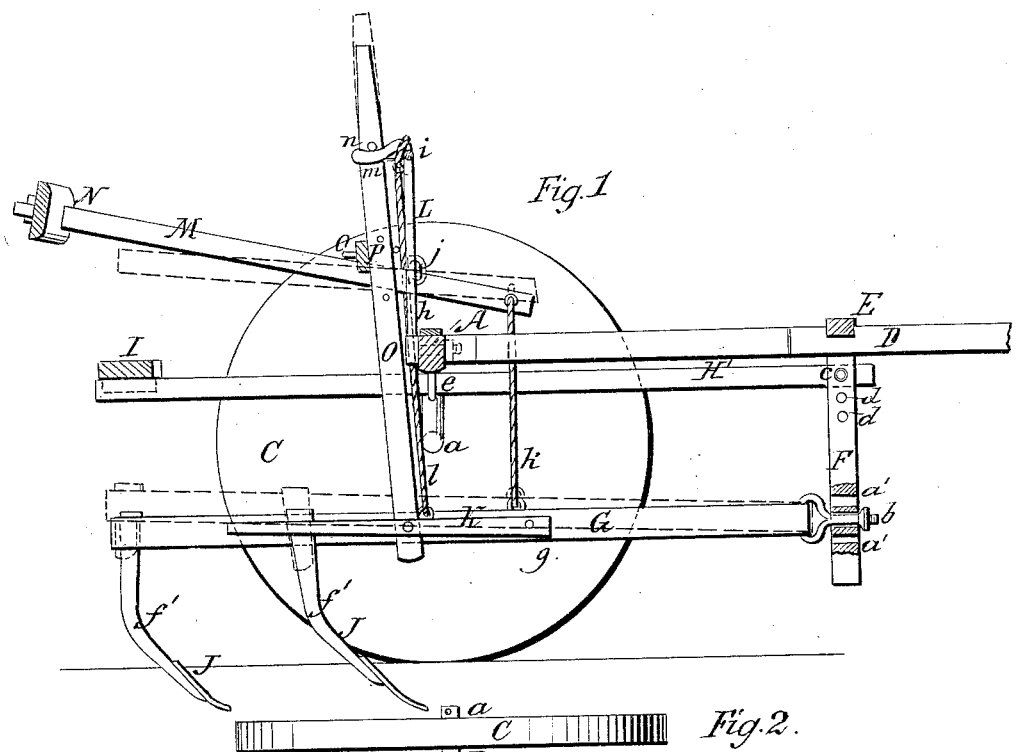
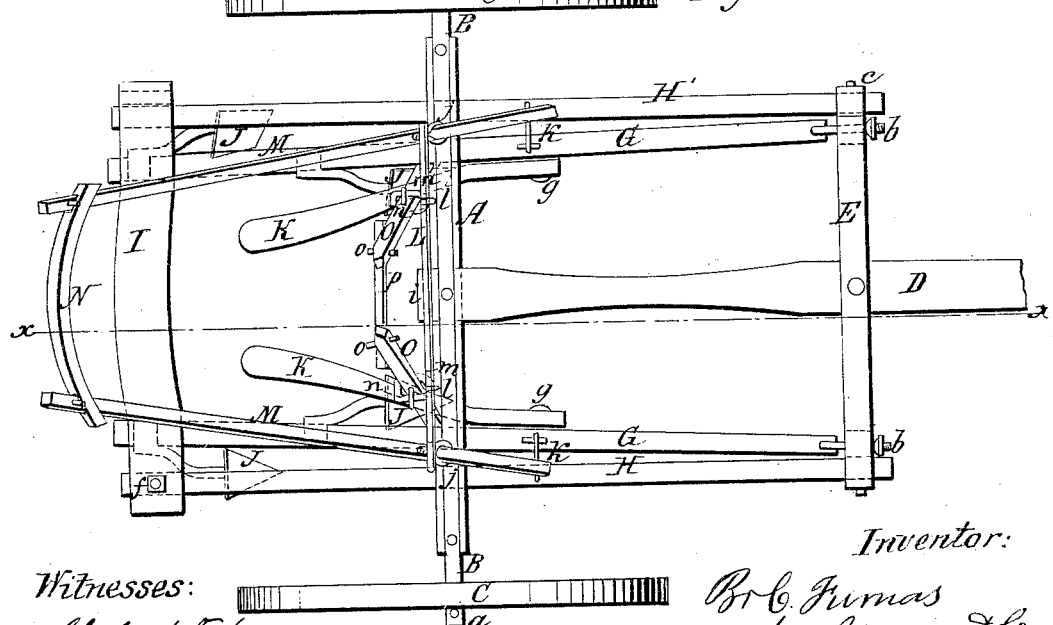
Witnesses:
Charles A. Fiske
G. W. Reed
Inventor:
B. & C. Furnas
by Munn & Co.
Attys.

UNITED STATES PATENT OFFICE.

B. FURNAS AND C. FURNAS, OF ONONWA, IOWA.

IMPROVEMENT IN CULTIVATORS.

Specification forming part of Letters Patent No. 36,948, dated November 18, 1862.

*To all whom it may concern:*

Be it known that we, B. FURNAS and C. FURNAS, of Ononwa, in the county of Louisa and State of Iowa, have invented a new and Improved Cultivator; and we do hereby declare that the following is a full, clear, and exact description of the same, reference being had to the accompanying drawings, making a part of this specification, in which—

Figure 1 is a side sectional view of our invention, taken in the line $x\ x$, Fig. 2. Fig. 2 is a plan or top view of the same.

Similar letters of reference indicate corresponding parts in the two figures.

This invention relates to an improvement in that class of cultivators in which a lateral as well as an up and down adjusting movement is allowed the shovel or plows.

The invention consists in a novel means which is employed for operating the shovels or plows, whereby the latter are placed under the complete control of the driver or operator and made to follow the sinuosites of the rows of plants, and also rendered capable of being raised and lowered with the greatest facility, so as to plow the required depth, the several parts being also so arranged that they may be adjusted to suit the driver—to favor the most convenient operation of them.

To enable those skilled in the art to make and use our invention, we will proceed to describe it with reference to the drawings.

A represents a bar, to which the axle B of two wheels, C C, is attached. The ends of the axle B are bent downward, so that the arms $a\ a$ may be below the bar A, and thereby admit of the frame of the machine being sufficiently elevated to pass over the plants under cultivation.

D is the draft-pole of the machine, the back end of which is secured to the bar A at its center, and to the draft-pole, at some distance from its back end, there is secured transversely a bar, E, which has a pendant, F, at or near each end of it. The pendants F F have each a series of holes, $a'$, made through them from their back to their front sides, and in any of these holes loops or links $b$ are fitted, as shown clearly in Fig. 1. These loops or links $b$ serve to secure bars G G to the pendants, and admit of said bars being raised and lowered to a certain extent at their back parts, and also admit of them being moved laterally.

To the pendants F F there are also attached two bars, H H', one to each. These bars are attached to the pendants by pins $c$, which pass through any of a series of holes, $d$, made laterally through the pendants or in a direction transverse with the machine. The bars H H' also pass through loops or bearings $e\ e$, attached to the under side of the bar A, and said bars H H' extend a considerable distance back of the bar A and have the driver's seat I placed upon them.

The seat I is secured by a bolt, $f$, to the bar H, but is not attached or permanently secured to the other one, H'. It simply rests upon it, and may be secured by any suitable catch or fastening. The object of this is to admit of the driver readily placing himself upon the seat, which is done by merely drawing the free or disengaged end out from the bar H', so that he can pass in between the bars H H' and then place himself upon it after it is properly adjusted in position on bar H', thereby saving the trouble of climbing over the seat, which would have to be done were it permanently attached to both bars H H'.

The bars G G are the plow-beams, and each has two shovels or plows, J J, attached to it by means of curved or bent standards $f'\ f'$, the standards of the foremost plows being curved or bent inward, and the standards of the back plows being bent or curved outward. By this means the front plows are brought nearer together than the back ones, as will be understood by referring to Fig. 2. Each plow-beam G has a treadle, K, attached to it by a pin or bolt, $g$. The use of these treadles will be presently shown.

L is a metal rod or bar, which is bent so as to form two vertical parts or uprights, $h\ h$, and a horizontal upper part, $i$. The lower ends of the uprights $h\ h$ are secured to the bar A, and they are each bent so as to form a loop or bearing, $j$, at about their centers. In each bearing $j$ there is fitted a bar, M, the back ends of which are connected by a curved cross-piece, N, which serves as a bearing for the back of the driver on seat I. The front ends of the bars M M are connected by cords or chains $k\ k$ to the plow-beams G G, and the driver by simply raising and lowering the bars M, which may be readily done by relieving the cross-piece N of the pressure of his back and then pressing with his feet on the bars G, when the plows are to be lowered, and depressing the back parts of said bars when the plows are to be raised.

The treadles K K are each connected to the horizontal part $i$ of the bar L by a cord or chain, $l$. These cords form fulcra for the treadles and cause the beams G to be elevated when the former are acted upon by the feet of the driver. The treadles thus arranged serve as a very convenient means for elevating the beams and plows, and in certain cases are preferable to the bars M for that purpose.

Each plow-beam G has an upright, O, attached to it. These uprights extend upward through guides $m$ $m$ connected to the horizontal part $i$ of the bar L, and the plow beams are sustained at a suitable height by pins $n$ $n$, which pass through the uprights O above the guides $m$. The uprights O O are connected by a cross-bar, P, having a series of holes made in it near each end, through which pins $o$ pass into the uprights. By adjusting these pins in different holes in the bar P the beams G may be secured at a greater or less distance apart, as may be desired. The plow-beams G may be attached higher or lower to the pendants F F, and the same may be said of the bars H H'. The seat I, therefore, can be adjusted higher or lower, so that the driver can actuate the beams or their treadles conveniently with his feet.

The plows are moved laterally under the action of the feet of the driver, the uprights O being allowed to work freely in the guides $m$ $m$, and either plow may be depressed or forced down, irrespective of the other, and one furrow may consequently be made deeper than the other, and this very frequently requires to be done.

Having thus described our invention, what we claim as new, and desire to secure by Letters Patent, is—

1. The bars H H', connected at their front ends to the pendants F F, and provided at their back ends with the driver's seat I, in combination with the bars M M, connected at their back ends with the cross-piece N, and attached to the plow-beams G G by the cords or chains $k$ $k$, all arranged substantially as and for the purpose herein set forth.

2. The treadles K K, when attached to the plow-beams G G, and connected to the cords or bar L by the cords or chains $l$, as and for the purpose herein set forth.

3. The uprights O O, attached to the plow-beams G G, fitted in the guides $m$ $m$ of the bar L, and connected by the bar P, substantially as and for the purpose specified.

B. FURNAS.
C. FURNAS.

Witnesses:
MARTHA J. HOUSE,
JACOB HOUSE.